United States Patent
Seifert

(10) Patent No.: US 8,618,690 B2
(45) Date of Patent: Dec. 31, 2013

(54) WIND POWER TURBINE COMBINING A CROSS-FLOW ROTOR AND A MAGNUS ROTOR

(75) Inventor: Jost Seifert, Manching (DE)

(73) Assignee: EADS Deutschland GmbH, Ottobrunn (DE)

(*) Notice: Subject to any disclaimer, the term of this patent is extended or adjusted under 35 U.S.C. 154(b) by 76 days.

(21) Appl. No.: 13/333,174

(22) Filed: Dec. 21, 2011

(65) Prior Publication Data

US 2012/0161447 A1 Jun. 28, 2012

(30) Foreign Application Priority Data

Dec. 22, 2010 (DE) .......................... 10 2010 055 687

(51) Int. Cl.
*F03D 11/04* (2006.01)

(52) U.S. Cl.
USPC ............................... 290/55; 290/44; 415/124

(58) Field of Classification Search
USPC ..................... 290/44, 55; 415/117, 124, 126
IPC ................ Y02E 10/74; F03D 3/00,3/007, 3/02, F03D 3/04; F05B 2240/201
See application file for complete search history.

(56) References Cited

U.S. PATENT DOCUMENTS

| | | | |
|---|---|---|---|
| 2008/0145224 A1* | 6/2008 | Mitchell et al. ........... | 416/132 B |
| 2009/0243302 A1 | 10/2009 | Eisenblaetter | |
| 2011/0133471 A1* | 6/2011 | Chung .......................... | 290/55 |
| 2012/0126542 A1* | 5/2012 | Deng ............................. | 290/55 |
| 2012/0160955 A1* | 6/2012 | Seifert ........................ | 244/21 |

FOREIGN PATENT DOCUMENTS

| | | |
|---|---|---|
| DE | 35 01 807 A1 | 7/1986 |
| DE | 21 2008 000 104 U1 | 12/2010 |
| EP | 2 098 723 A2 | 9/2009 |
| WO | WO 2006/039727 A1 | 4/2006 |

OTHER PUBLICATIONS

European Search Report with partial English translation dated Jun. 8, 2012 (seven (7) pages).

* cited by examiner

*Primary Examiner* — Vanessa Girardi
(74) *Attorney, Agent, or Firm* — Crowell & Moring LLP

(57) ABSTRACT

A wind power hybrid rotor of a wind power plant for converting wind energy into drive energy is provided. For a utilization of the wind energy in a manner as efficient as possible, a wind power hybrid rotor is provided with a cross-flow rotor, a guide device and a Magnus rotor. The cross-flow rotor is supported so as to be rotatable about a rotational axis and has a plurality of axially extending rotor blades. The guide device has a housing segment partially enclosing the cross-flow rotor in the circumferential direction in such a manner that the cross-flow rotor can be driven by inflowing wind. The Magnus rotor axis is arranged within the cross-flow rotor, and the Magnus rotor axis extends in the direction of the rotational axis. The Magnus rotor has a closed lateral surface and is rotatably driven about the Magnus rotor axis by a drive device.

11 Claims, 11 Drawing Sheets

WIND POWER TURBINE COMBINING A CROSS-FLOW ROTOR AND A MAGNUS ROTOR

CROSS REFERENCE TO RELATED APPLICATIONS

The present application claims priority under 35 U.S.C. §119 to German Patent Application No. 10 2010 055 687.4, filed Dec. 22, 2010, the entire disclosures of which is herein expressly incorporated by reference.

BACKGROUND AND SUMMARY OF THE INVENTION

The present invention relates to a wind power hybrid rotor, a wind power plant with a hybrid rotor, the use of a wind power hybrid rotor in a wind power plant and a method for converting wind energy into drive energy for performing work.

Rotors are used in wind power plants to be able to utilize wind energy to generate electrical energy. These rotors are set in rotation by the wind, thereby driving, e.g., a generator, i.e., the wind energy is at least partially converted into mechanical energy. Apart from the use for generating electrical energy, rotors are also used in particular for performing work, for example pumping or feeding work. Wind power plants are suitable, for example, for use in undeveloped or sparsely populated areas, for example, for decentralized energy supply. In addition, the use of wind power plants also gains increasing importance in connection with efforts concerning the utilization of regenerative energy sources.

There is a demand for a utilization of wind energy in a manner as efficient as possible.

This is achieved by a wind power hybrid rotor, a wind power plant, the use of a hybrid rotor in a wind power plant and by a method according to the present invention.

According to an exemplary embodiment of the invention, a wind power hybrid rotor is provided with a cross-flow rotor, a guide device and a Magnus rotor. The cross-flow rotor is supported so as to be rotatable about a rotational axis and has a plurality of axially extending rotor blades. The guide device has a housing segment partially enclosing the cross-flow rotor in the circumferential direction in such a manner that the cross-flow rotor can be driven by inflowing wind. The Magnus rotor is arranged within the cross-flow rotor, wherein the Magnus rotor axis extends in the direction of the rotational axis. The Magnus rotor has a closed lateral surface and is rotatably drivable by a drive device about the Magnus rotor axis.

By combining a cross-flow rotor with a Magnus rotor, a more efficient utilization of the wind power is made available compared to only a corresponding cross-flow rotor.

According to one aspect of the invention, the Magnus rotor is a rotationally symmetric hollow body which, by means of the Magnus effect, effects a deflection of an air flow.

According to this invention, the cross-flow rotor causes a circulating flow. This circulating flow is a rotational air flow which, at the same time, is superimposed with a translational air flow. The latter, in turn, is the cross inflow caused by the incoming wind flow. This combination flow causes the Magnus effect on a geometrical body subjected to the combination flow. Therefore, this body is designated as Magnus body.

In case of the combination flow, the rotational air flow can also be generated or facilitated by rotatingly driving the Magnus body. The rotation of the Magnus body or the Magnus rotor results in a stronger development of the Magnus effect and thus also in a stronger deflection of the air flow according to the invention.

The determining factor for the Magnus effect is the relative movement between the surface of the Magnus body and the combination flow with the mentioned cross deflection or cross flow and the circulating flow.

It should expressly be noted that due to the rotating cross-flow rotor in combination with the wind-air flow, e.g., a stationary Magnus body, for example, a stationary cylinder, can already cause a Magnus effect.

For example, the Magnus rotor is formed with a circular cross-section, i.e., with a diameter which remains constant along the rotational axis, thus in the form of a cylinder in a geometrical sense.

For example, the Magnus rotor can also be formed with a circular diameter that changes uniformly along the rotational axis, i.e., as a truncated cone.

For example, the Magnus rotor can have a diameter that increases and decreases again in a parabolic manner. For example, the Magnus rotor is a ball.

For example, the Magnus rotor can also be composed of different truncated cone segments and/or cylinder segments.

According to a further aspect of the invention, the Magnus rotor can be driven in the rotational direction of the cross-flow rotor.

According to a further aspect, the Magnus rotor can be driven counter to the rotational direction of the cross-flow rotor.

According to a further aspect of the invention, the rotational axis and the Magnus rotor axis are arranged transverse to the inflow direction of the wind.

According to a further aspect of the invention, the Magnus rotor axis runs parallel to the rotational axis of the cross-flow rotor.

According to a further aspect of the invention, the Magnus rotor is arranged concentrically with the cross-flow rotor.

According to an alternative aspect of the invention, the Magnus rotor axis is formed inclined with respect to the rotational axis of the cross-flow rotor, wherein the Magnus rotor axis spans a plane with the rotational axis. According to a further aspect of the invention, the Magnus rotor axis and the rotational axis of the cross-flow rotor can also be arranged inclined with respect to each other in such a manner that they lie in different planes, i.e., not in a common plane.

According to a further aspect of the invention, the housing segment shields the cross-flow rotor with respect to the rotational axis of the cross-flow rotor on the windward side on one side of the rotational axis.

According to a further aspect of the invention, the windward side is divided by a line into two segments, wherein the line extends in the direction of inflow and intersects the rotational axis.

According to a further aspect of the invention, the housing segment has a circular arc shape on the side facing toward the cross-flow rotor.

According to a further aspect of the invention, the housing segment is formed with the same cross-sectional shape over the entire length of the Magnus rotor.

According to an alternative aspect of the invention, the housing segment has different cross-sectional shapes over the length of the Magnus rotor. Accordingly, it is possible, for example, to provide additional steering effects with respect to the inflow, e.g., depending on the respective position with regard to the inflow.

According to a further exemplary embodiment of the invention, during rotation, the Magnus rotor effects on its lee side a deflection of the air flow with respect to the direction of the inflow.

According to a further aspect of the invention, the deflection takes place at or above a circumferential speed of the Magnus rotor which is preferably higher than the inflow speed of the wind power hybrid rotor.

According to a further exemplary embodiment of the invention, the deflection takes place in such a manner that air flow flowing through the cross-flow rotor acts on the rotor blades in an expanded circular arc and drives said rotor blades.

According to a further aspect of the invention, the deflection causes the air flow flowing through the cross-flow to act on the rotor blades in an additional circular arc segment of up to 90°.

According to a further aspect of the invention, in the axial direction, the rotor blades extend parallel to the rotational axis, i.e., they have a constant distance from the rotational axis.

According to an alternative aspect of the invention, in the axial direction, the rotor blades extend inclined to the rotational axis, wherein the rotor blades have an increasing or decreasing distance from the rotational axis, i.e., the rotor blades extend in each case in one plane with the rotational axis, but inclined to the rotational axis.

According to a further aspect of the invention, the cross-flow rotor has a rotating rotor axle and the rotor blades are retained on a support structure which also rotates and is fastened to the rotating rotor axle.

According to a further aspect of the invention, the rotor blades are configured to be stationary with respect to the tangential angular position.

According to a further exemplary embodiment of the invention, the rotor blades have a cross-section with a curved shape comprising a concave and a convex side, wherein the concave side faces toward the Magnus rotor.

According to a further aspect of the invention, the cross-section of the rotor blades have an angle of 15° to 70° with respect to the radial direction. For example, the cross-section of the rotor blades have an angle of 30° with respect to the radial direction. The term radial direction refers to a connection line between the rotor axis and the center of the cross-section of the rotor blade, and the direction of the cross-section, in case of a curved cross-sectional shape, refers to the tangential direction.

According to a further aspect of the invention, at least two, preferably 16 rotor blades are provided.

According to a further aspect of the invention, a distance is provided in the radial direction between the lateral surface of the Magnus rotor and the rotating rotor blades, wherein said distance depends on the diameter of the Magnus rotor.

For example, the diameter of the Magnus rotor is equal to or double the distance between the lateral surface and the rotor blades.

According to a further example, the ratio of diameter of the Magnus rotor and distance from the rotor blades is 2:1.

According to one aspect of the invention, the profile depth and the curvature of the rotor blades can be selected as desired, wherein these two parameters are in a relationship to each other with respect to the operational effect. In case of a very small profile depth and a correspondingly small distance, the curvature of the individual rotor blade is less significant. In addition, the diameter of the cross-flow rotor can be determined. The number of rotor blades in turn is associated with the diameter of the cross-flow rotor and the profile depth. Once these variables are determined, the inside diameter of the cross-flow rotor is also known, thus the distance of the rotor blades from the center. The diameter of the Magnus body, e.g. of a cylinder, then results from the above-mentioned ratio of distance between the rotor blades and the lateral surface of the Magnus body to the diameter of the Magnus body.

According to a further aspect of the invention, a distance is provided in the radial direction between the lateral surface of the Magnus rotor and the rotating blades, wherein said distance is one to two times the profile depth of a rotor blade, wherein the profile depth is measured independent of the angular position.

According to a further aspect of the invention, the rotor blades of the cross-flow rotor are arranged along a circular line about the rotational axis, wherein the circle has a diameter which is approximately five to eight times the profile depth of a rotor blade.

According to a further aspect of the invention, a circumferential distance of the rotor blades from each other is provided which is at least the profile depth of the rotor blades.

According to a further aspect of the invention, the axially extending rotor blades are divided into rotor blade segments and are formed differently over the entire length.

According to a further aspect of the invention, the Magnus rotor is divided into Magnus rotor segments which can be driven with a different speed.

According to a further aspect of the invention, the Magnus rotor has in the region of its ends in each case one end disk protruding beyond the circumferential surface of the Magnus rotor.

According to a further aspect of the invention, the Magnus rotor has a plurality of disks arranged between the two end disks. The disks have a greater diameter than the adjacent lateral surface segments of the Magnus rotor.

According to a further aspect of the invention, the cross-flow rotor has a repeller which can be driven by the wind.

According to a further exemplary embodiment of the invention, the Magnus rotor is driven with a circumferential speed which is approximately one to four times the inflow speed of the wind power hybrid rotor.

According to a further aspect of the invention, the cross-flow rotor has a circumferential speed which is approximately 50% of the inflow speed of the wind power hybrid rotor.

According to a further aspect of the invention, the ratio of rotation between the cross-flow rotor and the Magnus rotor is approximately 1:2 to 1:8.

According to a further aspect of the invention, the ratio of inflow speed of the wind power hybrid rotor/circumferential speed of the cross-flow rotor/circumferential speed of the Magnus rotor is approximately 1/1/1-4.

According to a further aspect of the invention, a transmission gear is provided between the cross-flow rotor and the Magnus rotor.

According to a further aspect of the invention, the transmission ratio of the transmission gear is changeable, for example in steps or stepless, e.g., depending on the wind force.

According to a further aspect of the invention, the wind force drives the Magnus rotor.

According a further exemplary embodiment of the invention, the cross-flow rotor drives the Magnus rotor.

This can take place, for example, via the transmission gear.

According to a further aspect of the invention, the cross-flow rotor provides energy for driving the Magnus rotor, e.g., by means of an electrical drive solution of the Magnus rotor.

According to a further aspect of the invention, the Magnus rotor, for starting up the wind power hybrid rotor, is electrically driven so as to enable a start up even in conditions of low wind.

According to a further aspect of the invention, the housing segment has a displacement mechanism and is configured in a pivotable manner at least with respect to the rotational axis of the cross-flow rotor.

According to a further exemplary embodiment of the invention, the displacement mechanism can be set depending on an inflow direction in such a manner that the housing segment shields the cross-flow rotor with respect to the rotational axis of the cross-flow rotor on the windward side on one side of the rotational axis.

According to a further aspect of the invention, the displacement mechanism has a wind sensor.

According to a further aspect of the invention, the wind sensor is a wind vane which is coupled to the displacement mechanism.

Also, according to the invention, a wind power plant comprises a rotor unit for converting wind movement into a rotational movement, a work device for converting the kinetic energy of the rotational movement into work to be performed, and a gear device for coupling the rotor unit to the drive device for transmitting the rotational movement to the work device. The rotor unit has at least one wind power hybrid rotor according to any one of the preceding exemplary embodiments or aspects of the invention.

According to a further exemplary embodiment of the invention, the work device is a current generator for generating electrical energy.

According to a further exemplary embodiment of the invention, the work device is a pump device, for example, for supplying drinking water or for pumping water for irrigation plants or also for drainage purposes, i.e., draining by pumping.

According to a further aspect of the invention, the work device is, for example, a mill unit for carrying out mill work, for example for driving milling processes, sawing processes, grinding processes etc.

According to a further aspect of the invention, a combination of the mentioned work devices is provided.

According to a further aspect of the invention, the rotor axis is arranged vertically, i.e., the rotational axis of the cross-flow rotor and also the Magnus rotor axis extend vertically.

According to an alternative aspect of the invention, the rotor axis is arranged horizontally.

According to a further aspect of the invention, the wind power hybrid rotor can be aligned with an inflow direction, for example, particularly if the rotor axis is arranged horizontally.

According to a further aspect of the invention, the wind power plant has a support construction on which the rotor unit, the gear device and the work device, for example, a generator, are retained.

According to a further aspect of the invention, the support construction is anchored in a foundation in the ground.

According to an alternative aspect of the invention, the support construction is anchored on a building structure, for example on a building such as, for example, a house or a bridge structure.

According to the invention, also, the use of a wind power hybrid rotor according to any one of the preceding exemplary embodiments and aspects of the invention is provided.

According to the invention, a method for converting wind energy into drive energy for performing work comprises the following steps which can also be designated as processes or sequences and take place at the same time:

a) Rotating a cross-flow rotor that is supported so as to be rotatable about a rotational axis and has a plurality of axially extending rotor blades; wherein a guide device is provided which has a housing segment which partially encloses the cross-flow rotor in the circumferential direction in such a manner that the cross-flow rotor is driven by inflowing wind.

b) Rotating a Magnus rotor arranged within the cross-flow rotor and the Magnus rotor axis of which extends in the direction of the rotational axis; wherein the Magnus rotor has a closed lateral surface and is driven by a drive device about the Magnus rotor axis.

c) Driving a work device by the cross-flow rotor.

The Magnus rotor deflects in step b) on its lee side with respect to the inflow direction in such a manner that the air flow flowing through the cross-flow rotor in step a) acts on the rotor blades in an expanded circular arc.

According to a further aspect of the invention, the Magnus rotor in step b) deflects the air flow by rotating at a circumferential speed which is higher than the inflow speed of the wind power hybrid rotor.

The direction of rotation of the Magnus rotor preferably takes place in the rotational direction of the cross-flow rotor, for example with a 0- to 4-fold rotational speed with respect to the speed of the inflowing air, i.e., with respect to the local wind speed.

According to a further aspect of the invention the Magnus rotor can rotate counter to the rotational direction of the cross-flow rotor, e.g., depending on the configuration of the cross-flow rotor.

For example, rotating of the Magnus rotor counter to the rotational direction of the cross-flow rotor and thus rotating of the two rotors in opposite directions can be provided, e.g., to enable braking in case of excessively strong winds.

According to a further aspect of the invention, measures for changing the surface roughness are provided, e.g., the latter is increased by a special surface structure. Thereby, depending on the expected wind speeds, the laminar flow or boundary layer flow can be influenced.

For example, the surface of the Magnus rotor can have a plurality of deepenings, e.g., a plurality of dents or dints.

For example, the surface can also have a plurality of elevations projecting from the surface, e.g., linear or punctiform elevations.

Thus, due to the deflection, a better utilization of the wind energy occurs, i.e., the rotor has overall a greater efficiency. Due to the Magnus effect, this efficiency is given despite the energy required for driving the Magnus rotor.

According to a further aspect of the invention, the work to be performed is the generation of electrical current.

According to a further aspect of the invention, the work to be performed is pumping water.

According to a further aspect of the invention, the work to be performed is mill work.

According to a further aspect of the invention, the work device is a current generator, and between the cross-flow rotor and the current generator, a gear device is provided by means of which the movement is transferred from the rotating cross-flow rotor to the work device.

According to a further aspect of the invention, the cross-flow rotor is shielded in step a) by the housing segment with respect to the rotational axis of the cross-flow rotor on the windward side on one side of the rotational axis.

According to a further aspect of the invention, the Magnus rotor is driven in step b) by the cross-flow rotor, for example, by direct coupling via a transmission gear or via an electrical drive of the Magnus rotor, wherein the electrical energy is generated by a generator which is driven by the cross-flow rotor.

It should be noted that the features of the exemplary embodiments and aspects of the devices also apply to embodiments of the method and to the use of the device and vice versa. Moreover, even those features for which this is not explicitly mentioned can be freely combined with each other.

Other objects, advantages and novel features of the present invention will become apparent from the following detailed description of one or more preferred embodiments when considered in conjunction with the accompanying drawings.

BRIEF DESCRIPTION OF THE DRAWINGS

The exemplary embodiments of the invention are illustrated in more detail hereinafter with reference to the accompanying drawings. In the figurers.

DETAILED DESCRIPTION OF THE DRAWINGS

Figure 1:
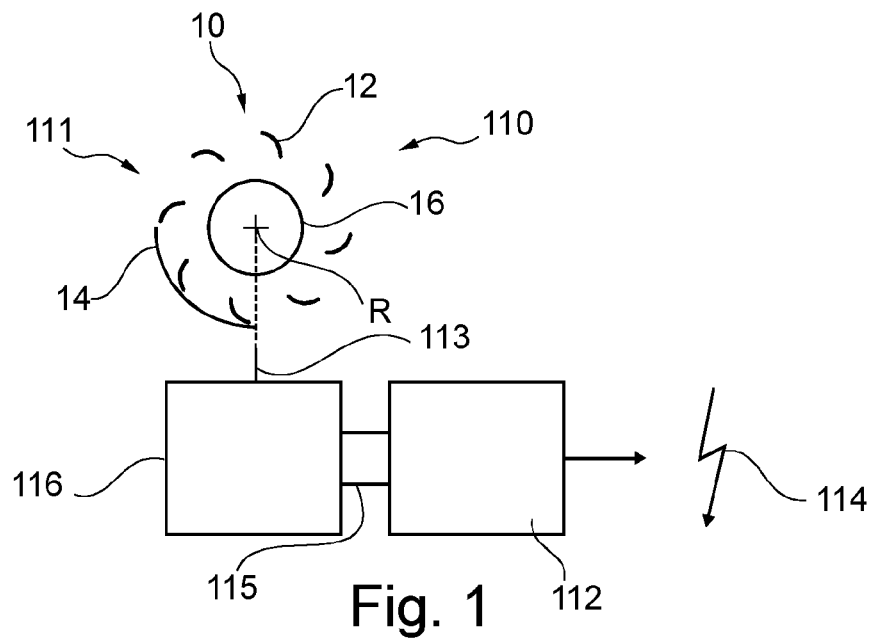
FIG. 1 schematically illustrates a wind power plant with a rotor device for converting wind movement into a rotational movement and a work device for converting the kinetic energy of the rotational movement into work to be performed according to a first exemplary embodiment of the invention.

FIG. 1 schematically illustrates a wind power plant 110 with a rotor device 111 for converting wind movement into a rotational movement and a work device 112 for converting the kinetic energy of the rotational movement into work 114 to be performed. Moreover, a gear device 116 for coupling the rotor device to the drive device is provided for transmitting the rotational movement to the drive device.

The work device 112 is, for example, a generator for generating electrical energy, which is the reason why a symbol of a lightning flash is shown to the right next to the box 112, which indicates that the work device 112 provides electrical energy or generates electrical current.

According to a non-illustrated exemplary embodiment, it is also possible to provide, instead of the generator for the work device 112, a pump unit or a mill unit or a combination thereof.

The connection of the rotor unit 112 to the gear device 116 is schematically indicated by a first connection line 113. The connection between the gear device 116 and the work device 112 is schematically indicated by a second connection line or a pair of connection lines 115.

According to the invention, the rotor unit 111 has at least one wind power hybrid rotor 10 according to any one of the following exemplary embodiments.

FIG. 1 indicates that the wind power hybrid rotor 10 comprises a cross-flow rotor 12, a guide device 14 and a Magnus rotor 16. Furthermore, a rotational axis is schematically indicated by the reference sign R, wherein the individual rotational axes of the cross-flow rotor 12 and the Magnus rotor 16 are yet to be discussed in more detail.

Figure 2:
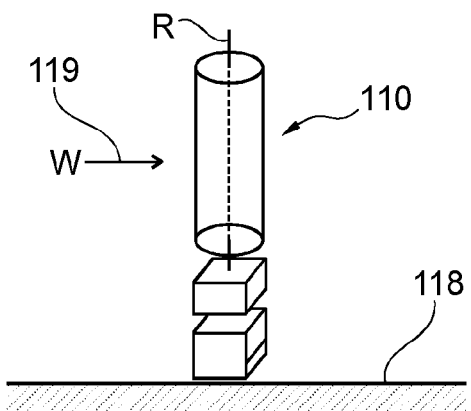
FIG. 2 shows schematically that the rotational axis can be arranged vertically, for which reason the wind power plant is arranged on a horizontal base area, and the rotational axis points vertically upward according to the invention.

FIG. 2 shows schematically that the rotational axis R can be arranged vertically, for which reason the wind power plant 110 is arranged on a horizontal base area 118, and the rotational axis R points vertically upward. In addition, the rotational axis R is aligned transverse to an inflow direction of the wind, indicated by the reference sign W and a schematic arrow 119.

Figure 3:
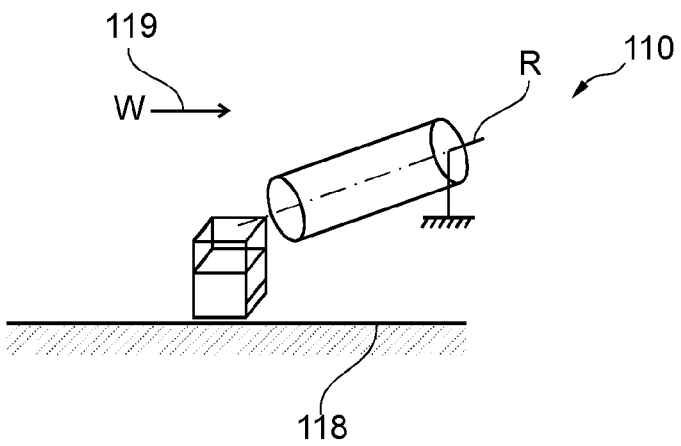
FIG. 3 shows a further exemplary embodiment of a wind power plant according to the invention in a perspective view, wherein the rotational axis is arranged horizontally, i.e., substantially parallel to a base area.

FIG. 3 shows a further exemplary embodiment of a wind power plant 110 according to the invention in a perspective view, wherein the rotational axis R is arranged horizontally, i.e., substantially parallel to a base area, for example, to the base area 118. In this arrangement the rotational axis is also arranged transverse to the inflow direction of the wind W or 119.

Figure 4:
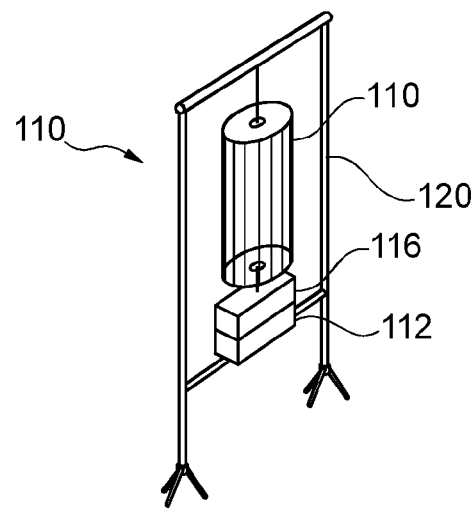
FIG. 4 shows a wind power plant with a support construction on which the wind power hybrid rotor, the gear device and the drive device are retained according to the invention.

FIG. 4 shows a wind power plant 110 with a support construction 120 on which the wind power hybrid rotor 10, the gear device 116 and the drive device 112, for example, a generator, are retained.

Figure 5:
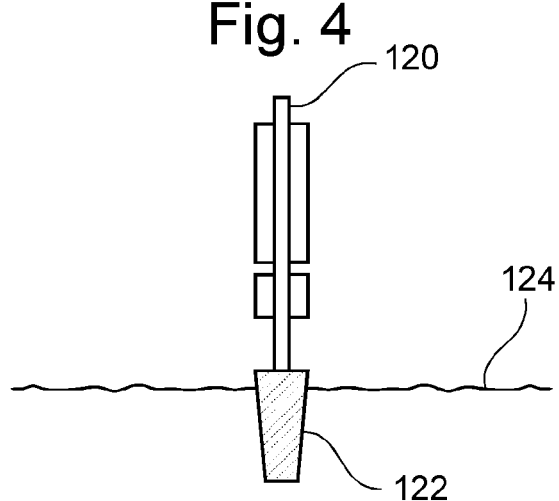
FIG. 5 shows schematically in a vertical section of a vertical sectional view support a construction anchored on a foundation in the ground according to the invention.

According to one aspect of the invention, the support construction 120 is anchored on a foundation 122 in the ground 124, which is schematically illustrated in FIG. 5 in a vertical section or a vertical sectional view.

Figure 6:
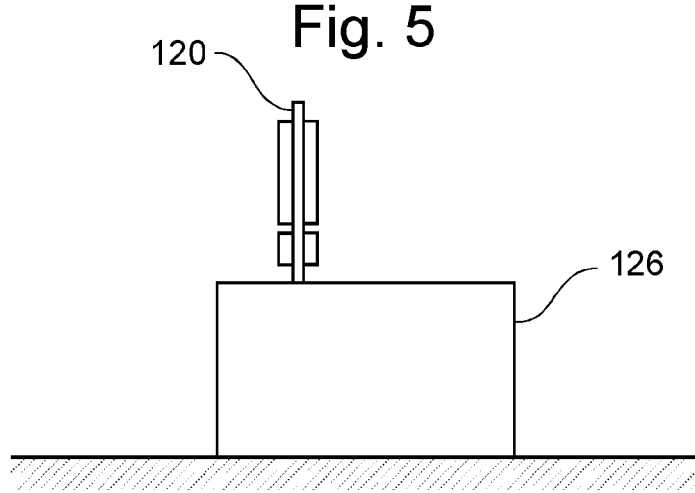
FIG. 6 schematically shows a support construction anchored at a building structure according to the invention.

According to a further aspect of the invention, the support construction 120 can also be anchored at a building structure 126, which is schematically illustrated in FIG. 6.

Figure 7:
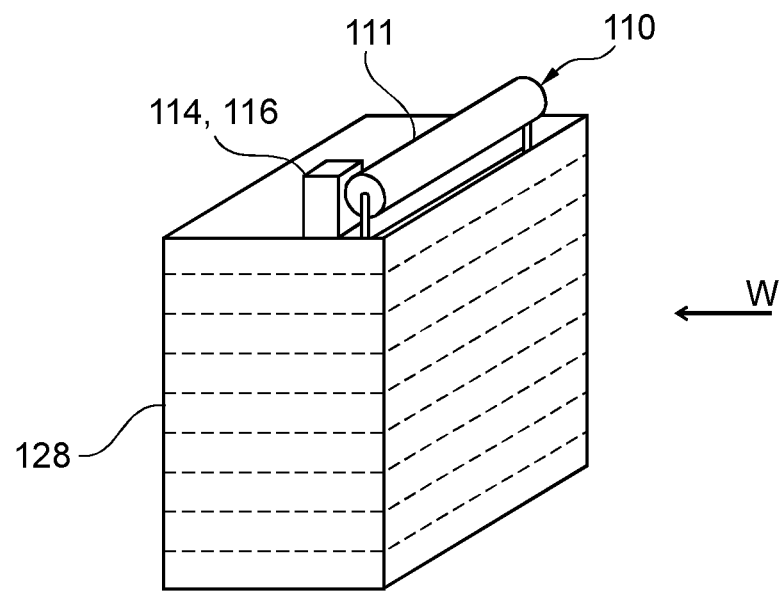
FIG. 7 shows the wind power plant with the rotor unit arranged on a structure according to the invention.

For example, the wind power plant 110 with the rotor unit 111 can be arranged on a structure, such as, for example, a building 128, which is illustrated in FIG. 7. The building can be, for example, a multi-story house, wherein the wind power plant 110 is arranged at a lateral edge of the roof area, in the example shown on the right side of the flat roof area. This is useful, for example, if a building is subjected to a main direction of the wind. Furthermore, FIG. 7 shows schematically the gear device 116 and the drive device 112.

According to a non-illustrated example of the invention, the gear device 116 and the work device 112 are formed integrally.

As is shown in FIG. 6 and FIG. 7, the arrangement on a building can be carried out such that the rotational axis is arranged vertically (FIG. 6) or horizontally (FIG. 7).

Of course, it is also possible to arrange the rotational axis in an inclined manner, for example in case of an inclined structure or a surface on a building that is suitable for the installation and is inclined, for example, an inclined roof, or also in case of an inclined floor surface.

According to a further aspect of the invention, the structure can also be a bridge structure 130 or another form of a traffic or infrastructure construction. For example, this can also concern a dam or power poles.

Figure 8:
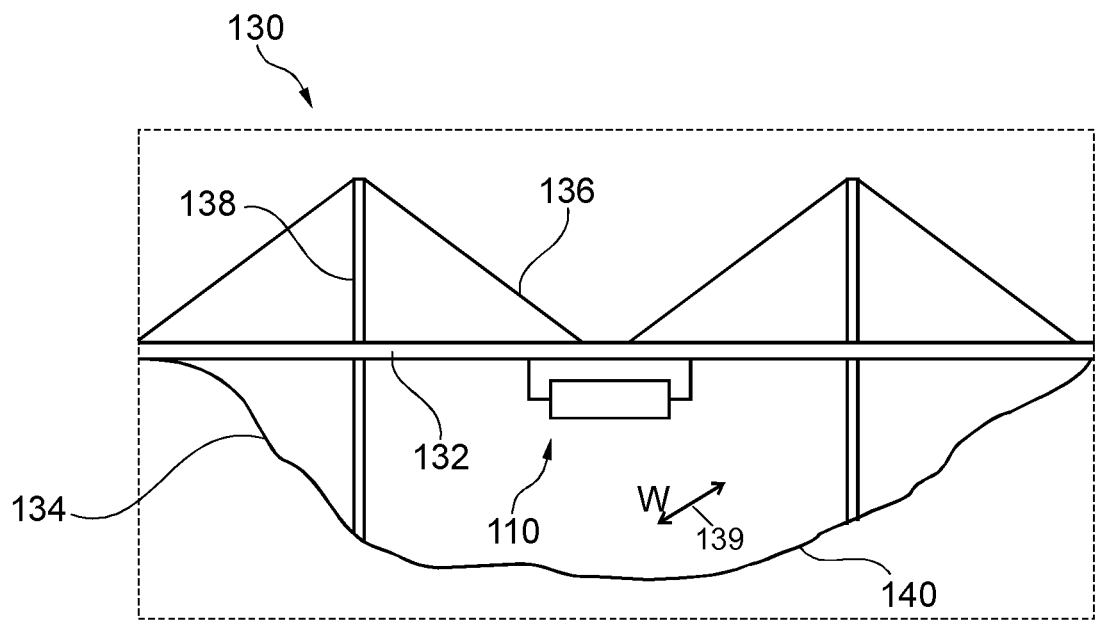
FIG. 8 schematically illustrates a bridge structure having a horizontal roadway extending across a natural depression according to the invention.

FIG. 8 schematically illustrates the bridge structure 130 having a horizontal roadway 132 which extends across a natural depression, for example, a valley. Said roadway 132 is supported by means of a schematically indicated guy construction 136 which, in turn, is guyed at a pole or support structure 138.

As an example, the wind power plant 110 is shown underneath the roadway construction 132 in order to be driven there by winds blowing transverse to the roadway, as indicated by a double arrow 139. This is useful, for example, if strong winds prevail in valley bottom 140 in the direction of the course of the valley, thus, strong crosswinds with respect to the roadway.

Below, the wind power hybrid rotor 10 is discussed based on FIG. 9. As already mentioned above, the wind power hybrid rotor 10 comprises the cross-flow rotor 12, the guide device 14 and the Magnus rotor 16.

The cross-flow rotor 12 is supported so as to be rotatable about a rotational axis D, which is also designated by the reference number 18, and has a plurality 20 of axially extending rotor blades 22.

The guide device 14 has a housing segment 24 partially enclosing the cross-flow rotor 12 in the circumferential direction in such a manner that the cross-flow rotor 12 can be driven by the inflowing wind W. The inflowing wind W is schematically shown with a wind arrow 60 and an indicated flow 26.

The Magnus rotor 16 is arranged within the cross-flow rotor 12, wherein the Magnus rotor axis extends in the direction of the rotational axis. The Magnus rotor 16 has a closed lateral surface 28 and can be rotatably driven by a drive device 30 (not shown in detail) about the Magnus rotor axis.

Figure 9:
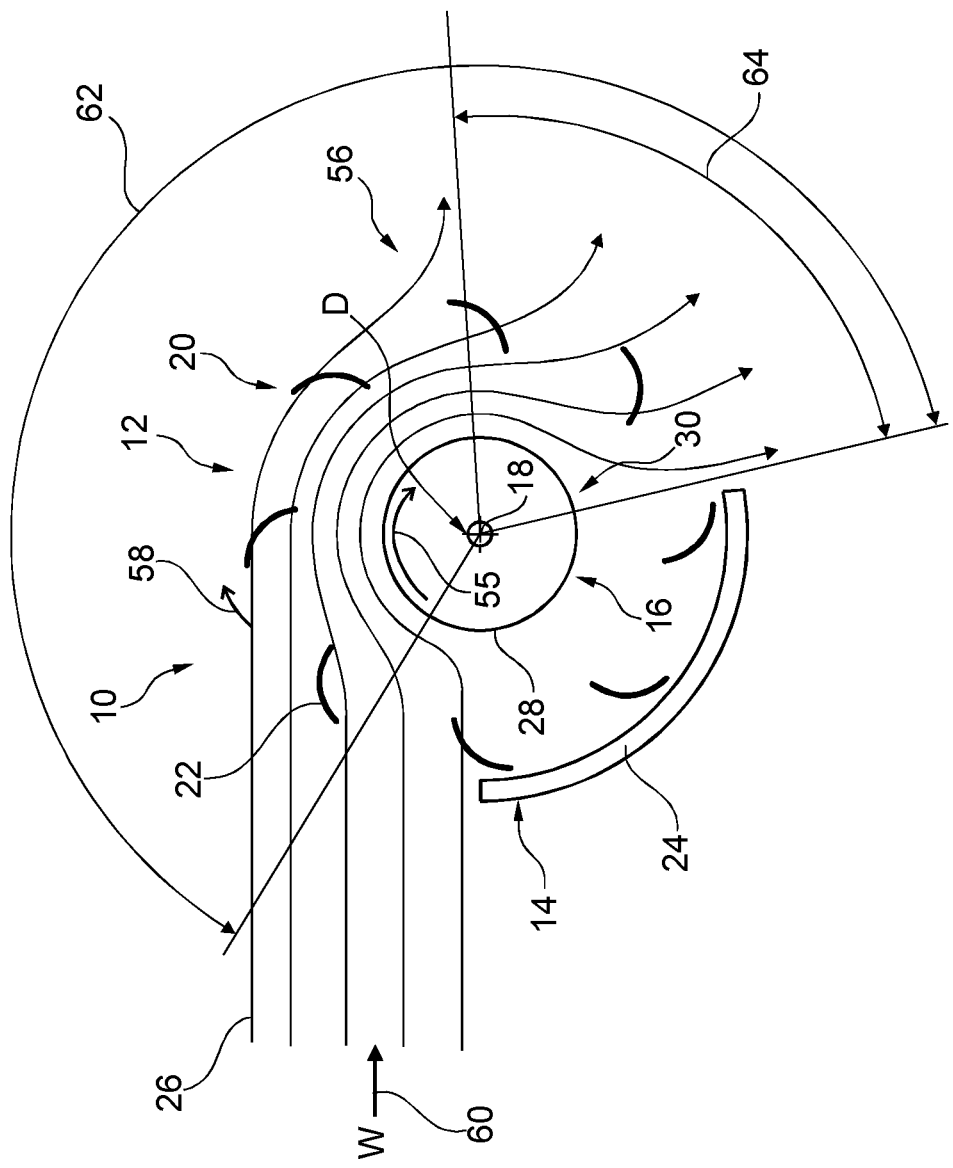
FIG. 9 schematically shows the wind power hybrid rotor 10 in a cross-sectional view according to the invention.

With respect to the illustration in FIG. 9, the Magnus rotor 16 can be rotated clockwise, for example. The cross-flow rotor 12, for example, can also be rotated clockwise.

At least the Magnus rotor 16 can also be rotatable in the opposite direction, i.e., counterclockwise.

FIG. 9 schematically shows the wind power hybrid rotor 10 in a cross-sectional view.

Before discussing the mode of operation or the flow conditions, individual constructional aspects are discussed in more detail.

Figure 10A:
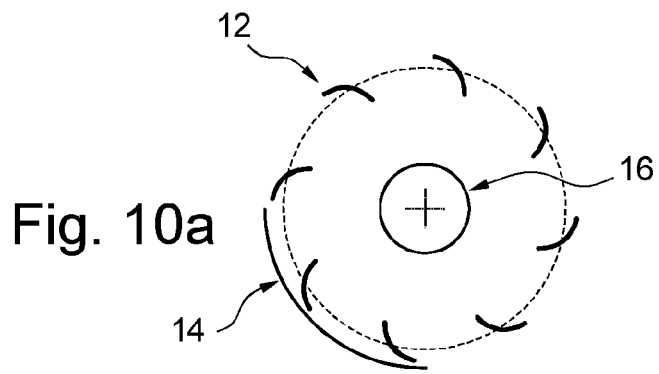
FIGS. 10a schematically shows the cross-section of the wind power hybrid rotor with the cross-flow rotor, the guide device, and the Magnus rotor and 10b shows the Magnus rotor in a longitudinal section as a cylinder according to the invention.
Figure 10B:
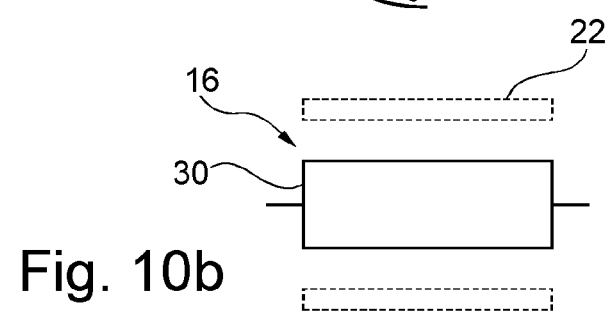

FIG. 10a schematically shows the cross-section of the wind power hybrid rotor with the cross-flow rotor 12, the guide device 14 and the Magnus rotor 16. In FIG. 10b, the Magnus rotor 16 is shown in a longitudinal section as a cylinder 30, wherein the rotor blades 22 of the cross-flow rotor 12 are indicated only by dashed lines.

Figure 11:
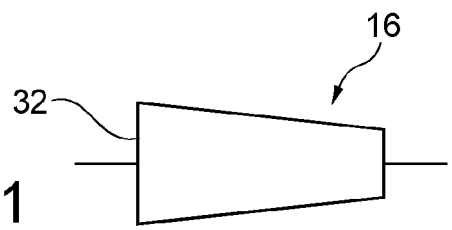
FIG. 11 shows a Magnus rotor formed with a diameter that changes uniformly along the rotational axis according to the invention.

According to a further exemplary embodiment, the Magnus rotor 16 is formed with a diameter that changes uniformly along the rotational axis, i.e., with a truncated cone 32, as shown in FIG. 11.

Figure 12:
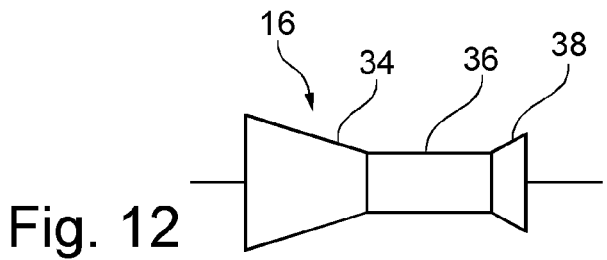
FIG. 12 shows a Magnus rotor composed of different truncated cone segments and/or cylinder segments according to the invention.

According to a further exemplary embodiment, the Magnus rotor 16 can also be composed of different truncated cone segments 34, 38 and/or cylinder segments 36, as schematically illustrated in FIG. 12.

According to one aspect of the invention, the Magnus rotor axis extends parallel to the rotational axis of the cross-flow rotor.

The Magnus rotor 16 can be arranged concentric to the cross-flow rotor 12, as this is the case in FIG. 9.

Figure 13:
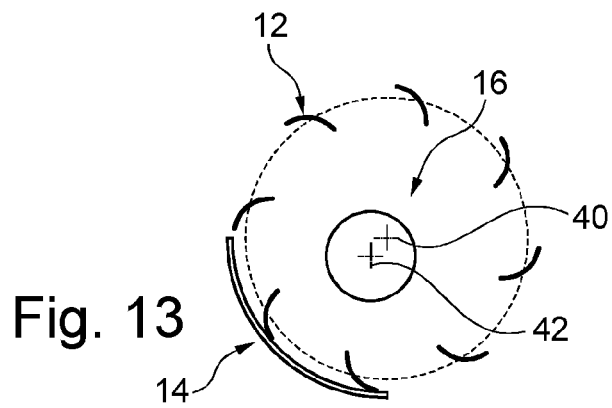
FIG. 13 shows a rotational axis of the cross-flow rotor can be arranged offset with respect to the rotational axis of the Magnus rotor according to the invention.

According to a further aspect of the invention, the rotational axis of the cross-flow rotor 12, indicated in FIG. 13 by a cross 40, can be arranged offset with respect to the rotational axis of the Magnus rotor 16, indicated by a center cross 42. For example, within the cross-flow rotor 12, the Magnus rotor 16 is arranged displaced toward the guide device 14.

According to a further aspect of the invention, the housing segment 24, i.e., the guide device 14, shields the cross-flow rotor 12 with respect to the rotational axis D of the cross-flow rotor on a side facing toward the wind, i.e., the windward side, indicated by reference number 44, on a side 50a of the rotational axis. The windward side 44 is divided by a line 52 into two segments 50a, 50b, wherein the line 52 runs in the inflow direction, i.e., parallel to the direction of the wind W and intersects the rotational axis D. With respect to the rotational axis, a second line 48 can be placed through the rotational axis, where the second line runs transverse to the direction of the wind W and wherein in the variant shown in FIG. 14, the windward side 44 is located on the left thereof, whereas the lee side is on the right side, indicated by the reference number 46.

For example, the housing segment is formed with the same cross-sectional shape over the entire length of the Magnus rotor.

Figure 14:
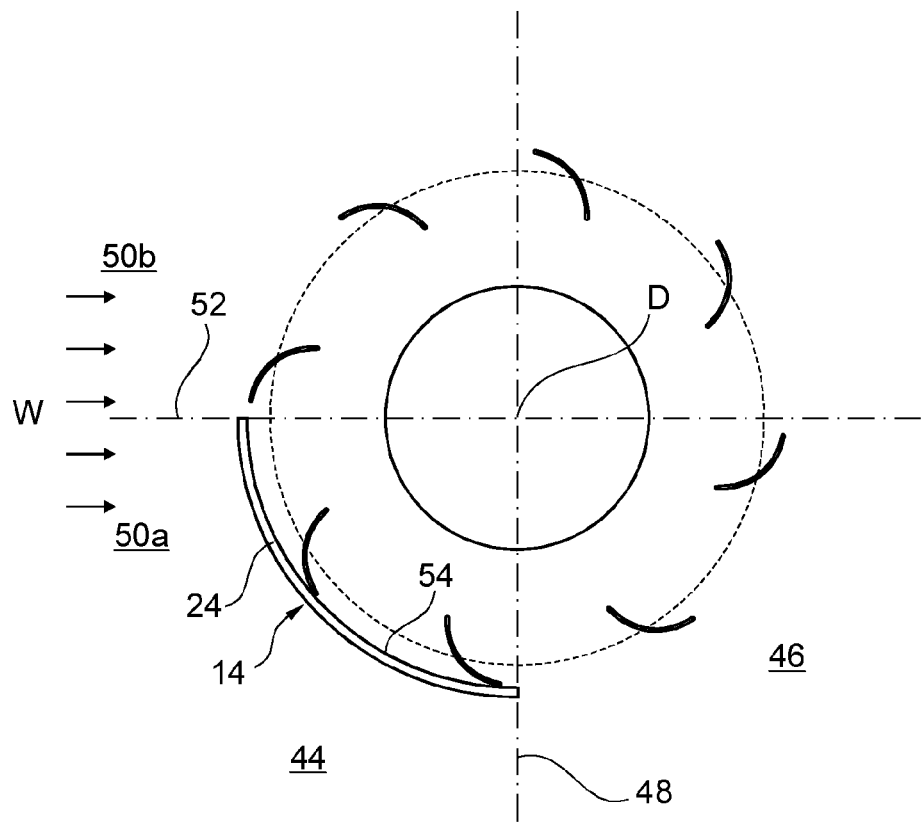
FIG. 14 shows, in a sectional view, a housing segment having a circular arc shape adapted to the cross-flow rotor or the rotor blades of the same according to the invention.

As is shown in FIG. 14 in the sectional view, on the side 54 facing toward the cross-flow rotor, the housing segment 24 has a circular arc shape which is adapted to the cross-flow rotor or the rotor blades 22 of the same.

Figure 15:
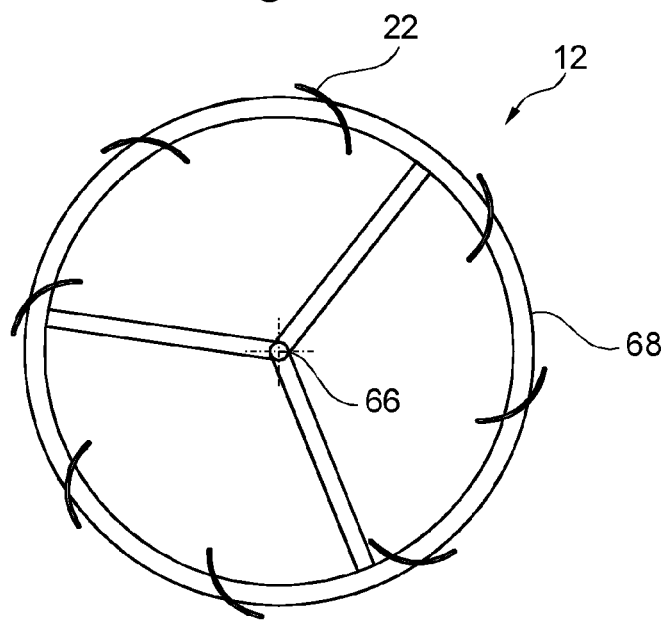
FIG. 15 shows, in a cross-section, the cross-flow rotor having a rotating rotor axle, wherein the rotor blades are retained on a support structure which also rotates and is fastened to the rotating rotor axle according to the invention.

According to a further exemplary embodiment, which is shown in FIG. 15 in a cross-section, the cross-flow rotor 12 has a rotating rotor axle 66, wherein the rotor blades 22 are retained on a support structure 68 which also rotates and is fastened to the rotating rotor axle 66. With respect to the tangential angular position, the rotor blades are configured to be stationary.

Figure 16:
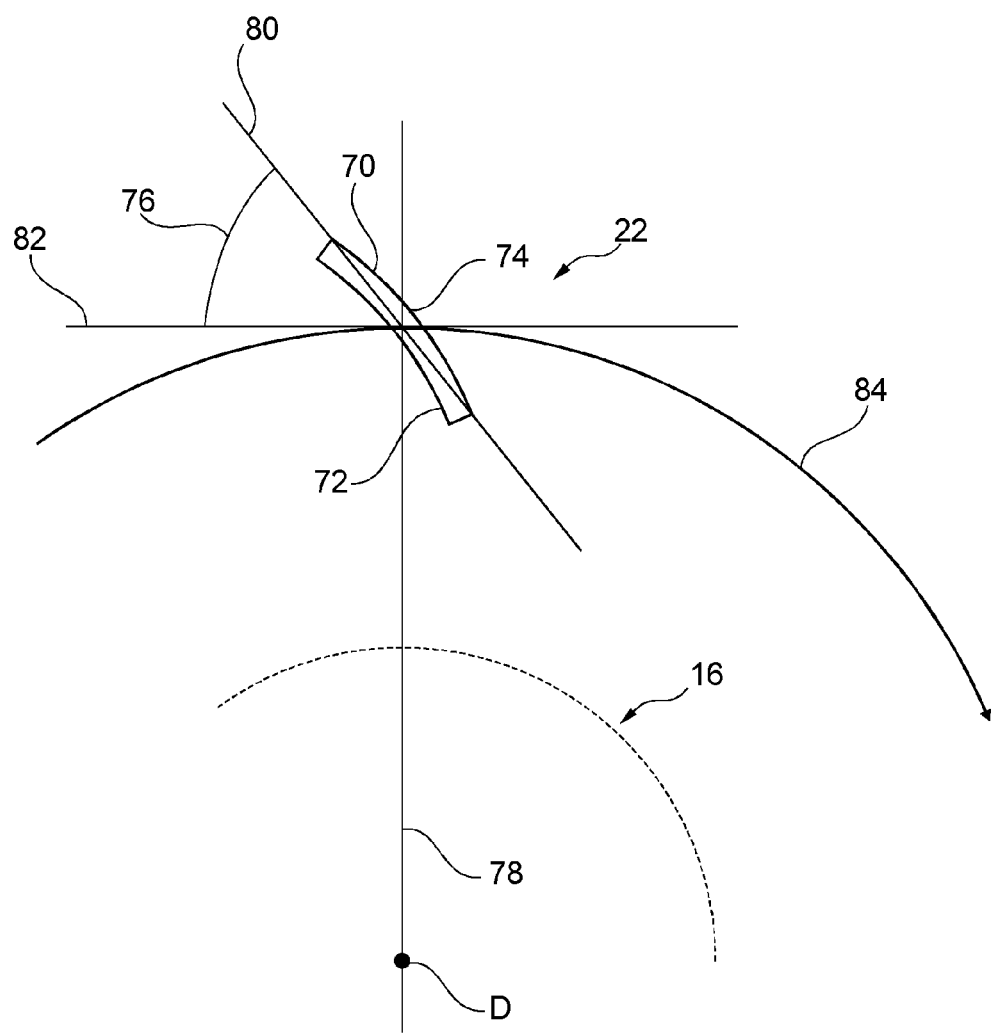
FIG. 16 shows rotor blades having a cross-section with a curved shape that includes a concave side and a convex side according to the invention.

According to the exemplary embodiment shown in FIG. 16, the rotor blades 22 each have a cross-section with a curved shape 70 comprising a concave side 72 and a convex side 74.

As shown, the concave side 72 faces toward the Magnus rotor 16 which is indicated in FIG. 16 only by a dashed line. The cross-section of the rotor blades 22 is arranged at an angle of 15° to 70°, preferably 30°, with respect to the radial direction. The term radial direction relates to a connection line 78 between the rotor axis D and the center of the cross-section of the rotor blade 22. In case of a curved cross-sectional shape, such as the curved shape 70, the cross-sectional direction relates to the tangential direction which is indicated by a line 80. The tangential direction is indicated by a line 82 running tangential to a circular line 84 on which the rotor blade 22 moves. This results in the angle, indicated by reference number 76, between the line 80 and the tangential line 82.

It is to be noted that the illustrations of the cross-flow rotor, in particular of the rotor blades 22, are schematic in particular with respect to proportions and quantity.

Figure 17:
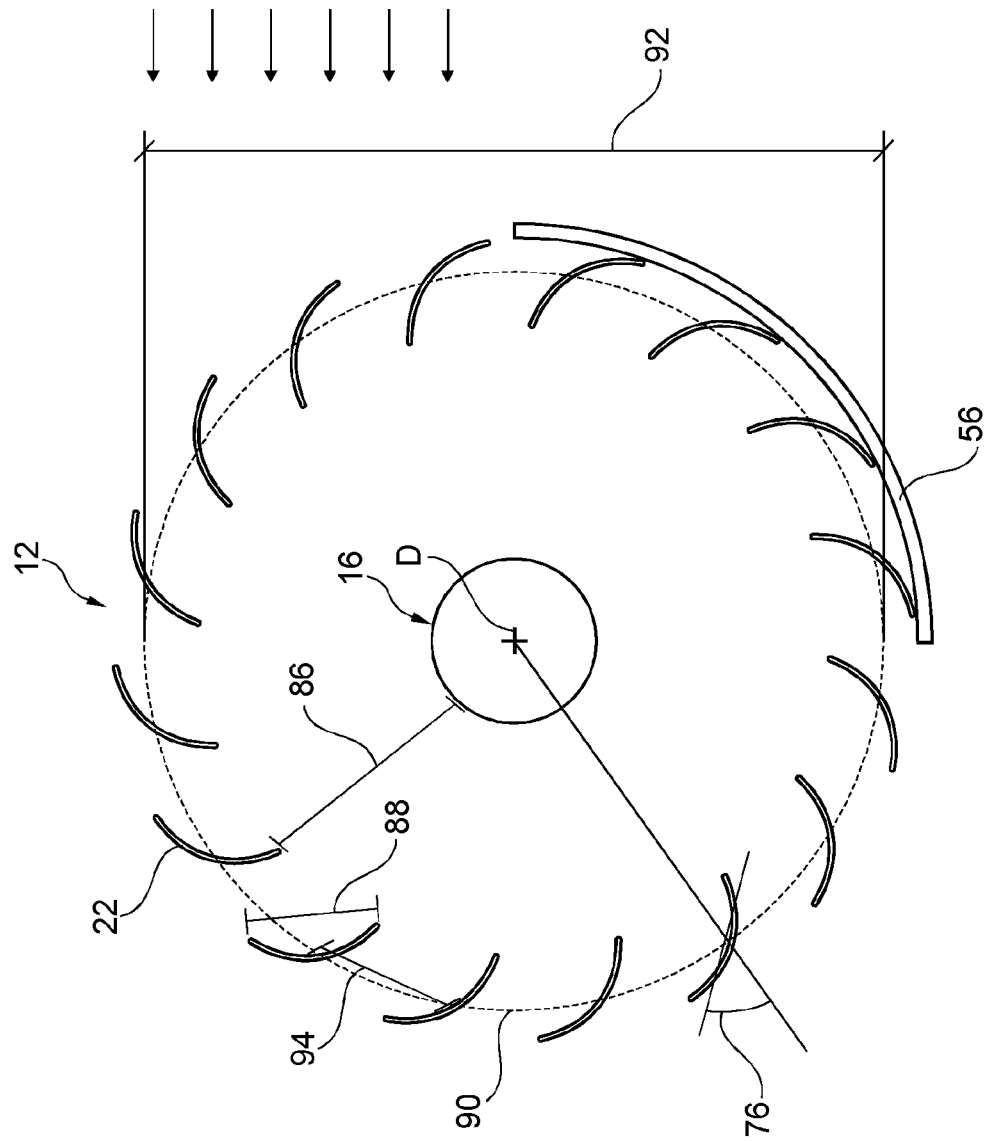
FIG. 17 shows a further exemplary embodiment of a wind power hybrid rotor with 16 blades according to the invention.

According to a further aspect of the invention, at least two, preferably 16 rotor blades 22 are provided, as shown in FIG. 17.

According to one aspect of the invention (not shown in more detail), a distance is provided in the radial direction between the lateral surface of the Magnus rotor and the rotating rotor blades, wherein said distance depends on the diameter of the Magnus rotor.

For example, the diameter of the Magnus rotor is equal to or twice as large as the distance of the lateral surface from the rotor blades.

According to a further example, the ratio of diameter of the Magnus rotor and distance from the rotor blades is 2:1.

A further example is shown in FIG. 17. In the radial direction between the lateral surface of the Magnus rotor 16 and the rotating rotor blades 22, a distance 86 is provided which is one to two times the profile depth 88 of a rotor blade, wherein the profile depth is measured independently of the angular position.

As already mentioned, according to another example, deviating from FIG. 17, the distance has a dimension that is one to half the diameter of the Magnus body 16.

Moreover, FIG. 17 shows a further aspect according to which the rotor blades 22 of the cross-flow rotor 12 are arranged along a circular line 90 about the rotational axis, wherein the circle 90 has a diameter 92 which is five to eight times the profile depth of a rotor blade 22.

The rotor blades 22 have a circumferential distance 94 from each other which is at least as large as the profile depth of the rotor blades.

The profile depth, the circumferential distance and the quantity of rotor blades, for example, are principally freely selectable. When using the preferred ratio "distance/diameter Magnus body", this results, for example, in the diameter of the Magnus body and the distance between the rotor blades and the lateral surface of the Magnus body.

Figure 18:
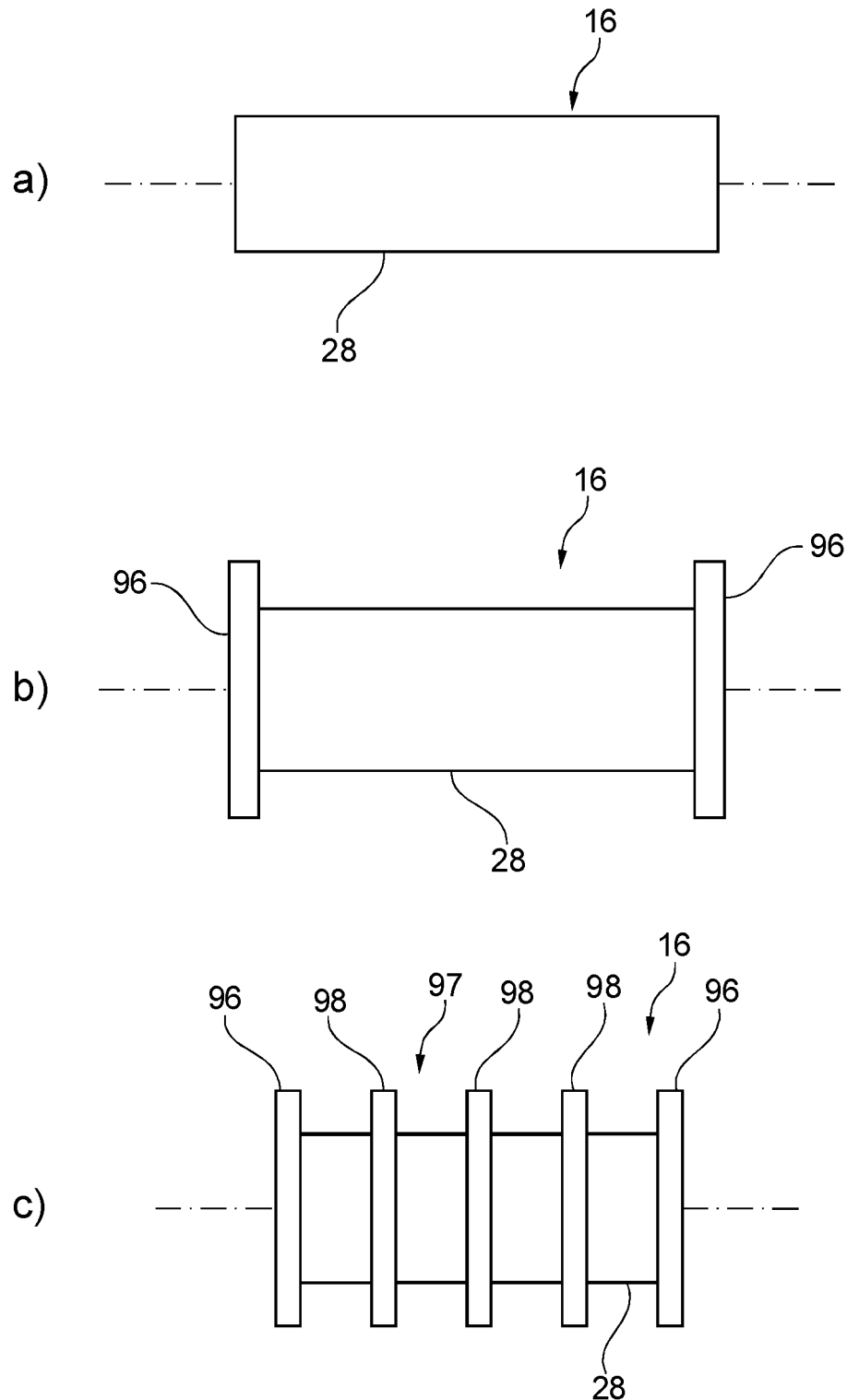
FIGS. 18a-18c respectively show a Magnus rotor that is a cylinder, a Magnus rotor having an end disk in the region of its ends, and a Magnus rotor having a plurality of disks arranged between two end disks according to the invention.

According to a further exemplary embodiment, the Magnus rotor 16 is a cylinder, the lateral surface 28 of which is illustrated in FIG. 18a.

According to a further aspect which is shown in FIG. 18b, the Magnus rotor 16 has in each case, in the region of its ends, one end disk 96 that protrudes beyond the Magnus rotor surface.

In a further embodiment, the Magnus rotor 16 has a plurality 97 of disks 98 arranged between the two end disks 96, where the disks have a greater diameter than the adjacent lateral surface segments of the lateral surface 28 (see FIG. 18c).

According to a non-illustrated aspect, the plurality of disks can also be provided without the two end disks.

Below, the mode of operation of the Magnus rotor 16 is discussed with reference to FIG. 9. As already mentioned, the guide device 14 causes a partial shielding of the cross-flow rotor so that the rotor blades 22 can be driven clockwise by the wind flowing in from the left, wherein when rotating counter to the direction of the wind, the rotor blades are shielded by the guide device 14.

If the Magnus rotor 16 provided within the cross-flow rotor 12 is also driven in a clockwise direction, as schematically indicated in FIG. 9 by a rotation arrow 55, during the rotation this results in the Magnus rotor 16 effects on its lee side, i.e. in FIG. 9 to the right of the Magnus rotor 16, a deflection of the air flow with respect to the inflow direction, which is indicated by the flow arrows which run differently in this region (marked by reference number 56).

The deflection 56 takes place at a circumferential speed of the Magnus rotor which is preferably higher than the inflow speed of the wind power hybrid rotor.

In FIG. 9, the circumferential speed of the Magnus rotor 16 is indicated with the movement arrow 55; the inflow speed, i.e., the wind speed, is indicated by the wind arrow 60. It is clearly shown that the deflection takes place such that an air flow flowing through the cross-flow rotor acts on the rotor blades 22 in an expanded circular arc 62, thereby driving the rotor blades 22, i.e., the cross-flow rotor.

According to a further aspect of the invention, the deflection causes the air flow flowing through the cross-flow rotor 12 to act on the rotor blades 22 in an additional circular arc segment 64 of up to approximately 90°.

Thus, overall, a longer distance is provided for driving the cross-flow rotor by the wind, i.e., a more efficient utilization of the wind energy is made possible.

For example, the cross-flow rotor 12 has a circumferential speed, indicated by a rotation arrow 58, which is approximately 50% of the inflow speed of the wind power hybrid rotor.

According to a further aspect of the invention, the rotation ratio between the cross-flow rotor 12 and the Magnus rotor 16 is approximately 1:2 to 1:8.

According to a further aspect of the invention, this results in a ratio of inflow speed of the wind power hybrid rotor/ circumferential speed of the cross-flow rotor/circumferential speed of the Magnus rotor of approximately 1/1/1-4.

Figure 19:
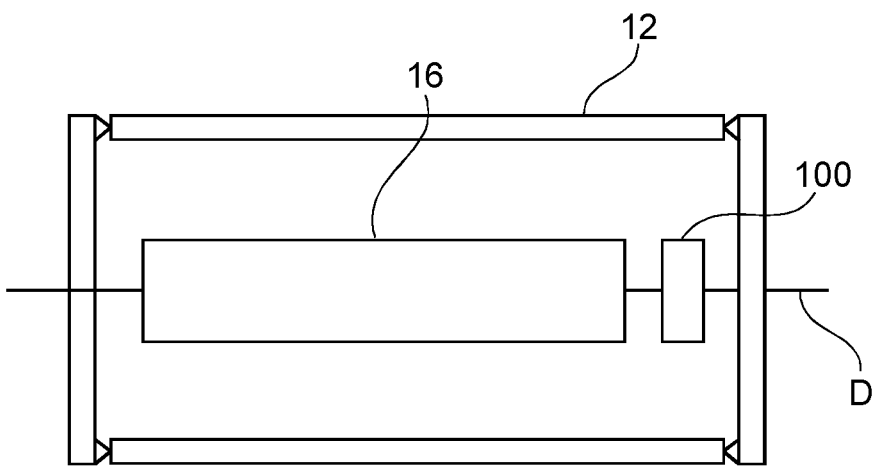
FIG. 19 shows a transmission gear provided between the cross-flow rotor and the Magnus rotor according to the invention.

For example, between the cross-flow rotor 12 and the Magnus rotor 16, a transmission gear 100 can be provided, which is schematically indicated in FIG. 19. The transmission gear can have a transmission ratio which, for example, is continuously adjustable or adjustable in steps.

According to a further exemplary embodiment which, however, is not shown in more detail, the cross-flow rotor 12 provides energy to drive the Magnus rotor 16. This can be carried out with an electrical drive arrangement which, however, is not shown in more detail.

In case of an electrical drive arrangement for the Magnus rotor 16, for example, the Magnus rotor 16 can also be driven electrically for starting up the wind power hybrid rotor 10 in order enable a start up even at conditions of low wind.

Figure 20:
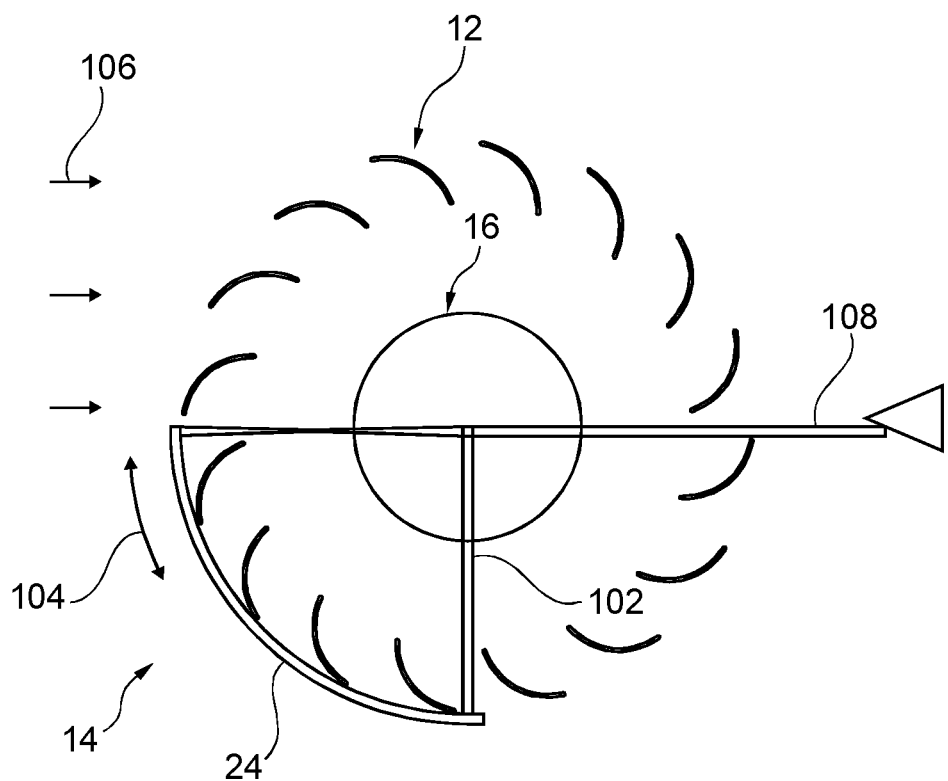
FIG. 20 shows a housing segment having a displacement mechanism and configured in a pivotable manner according to the invention.

According to a further aspect of the invention, the housing segment 24 has a displacement mechanism 102 and is configured in a pivotable manner, at least with respect to the rotational axis of the cross-flow rotor 12. This is indicated in FIG. 20 with a double arrow 104 for the pivoting movement. Thus, in case of an inflow direction which deviates from the direction indicated in FIG. 20 by the arrows 106, it is possible to align the housing segment 24 in such a manner that it shields the cross-flow rotor 12 with respect to the rotational axis of the cross-flow rotor on the windward side on one side of the rotational axis.

For example, the displacement mechanism 102 has a wind sensor, which is schematically indicated in FIG. 20 by a wind vane 108 coupled to the displacement mechanism. The wind sensor allows repositioning in case of a changing wind direction.

In case of a horizontal arrangement (not shown in more detail) of the rotational axes, the displacement mechanism allows the utilization of two opposite wind directions, as it often occurs near the coast. To a certain extent, the cross-flow rotor can also be subjected to an oblique inflow. If the wind direction changes too much, e.g., by more than 30°, an alignment mechanism can be provided by means of which the plant can be pivoted horizontally.

According to a further aspect of the invention, a measuring sensor can be provided by means of which the wind direction is detected, and an actuator can be activated which carries out a pivot movement or an adjustment of the housing segment depending on the wind direction.

Figure 21:
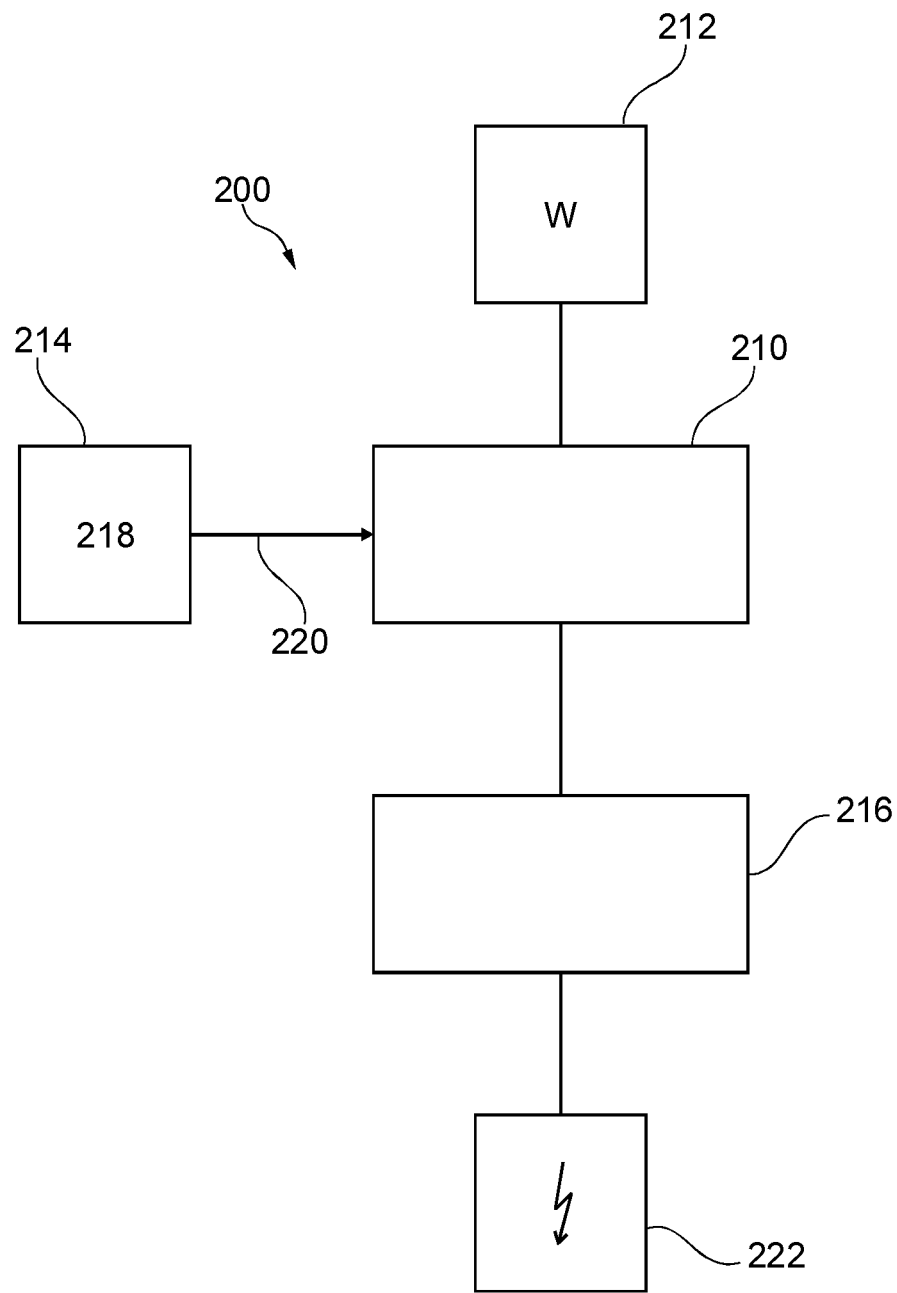
FIG. 21 shows an exemplary embodiment of a method for converting wind energy into drive energy for performing work according to the invention.

FIG. 21 shows schematically a method 200 for converting wind energy into drive energy for performing work, the method comprising the following steps:

Rotating a cross-flow rotor in a first rotation process 210, wherein the cross-flow rotor is supported so as to be rotatable about a rotational axis and has a plurality of axially extending rotor blades. A guide device is provided which has a housing segment which partially encloses the cross-flow rotor in the circumferential direction in such a manner that the cross-flow rotor is driven by the inflowing wind, which is schematically indicated with reference number 212.

Rotating a Magnus rotor in a further rotation process 214, wherein the Magnus rotor is arranged within the cross-flow rotor, and the Magnus rotor axis extends in the direction of the rotational axis. The Magnus rotor has a closed lateral surface and is driven about the Magnus rotor axis by a drive device.

Driving a drive device in a drive process 216 by the cross-flow rotor.

According to the invention, the Magnus rotor deflects the air flow in the further rotation process 214 on its lee side with respect to the inflow direction in a deflection process 218 in such a manner that the air flow flowing through the cross-flow rotor in the first rotation process 210 acts on the rotor blades in an expanded circular arc, which is indicated by an action arrow 220 from the second rotation process 214 to the first rotation process 210.

For example, deflecting takes place at a circumferential speed that is higher than the inflow speed of the wind power hybrid rotor.

The first rotation process 210 is also designated as step or process a), the further rotation process 214 as step or process b), and the drive process 216 as step or process c).

The steps a), b) and c) take place at the same time.

Driving the work device can involve, for example, electrical energy, which is schematically illustrated in FIG. 21 by the output process 222.

According to a further aspect of the invention which, however, is not shown in more detail, instead of the electrical current or also for supplementing the generation of electrical current, the drive power provided from step 216 can be used for other work, for example, for pumping water or for different mill work.

The above-described exemplary embodiments can be combined in different ways. In particular, it is also possible to use aspects of the devices for embodiments of the method and the use of the devices and vice versa.

In addition, it is to be noted that "comprising" does not exclude other elements or steps and "a" or "one" does not exclude a plurality. Furthermore, it is to be noted that features or steps which have been described with reference to one of the above exemplary embodiments and aspects can also be used in combination with other features or steps of other above-described exemplary embodiments and aspects. Reference numbers in the claims are not to be considered as limitation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wind power hybrid rotor, comprising
a cross-flow rotor;
a guide device; and
a Magnus rotor;
wherein the cross-flow rotor is configured rotatable about a rotational axis and has a plurality of axially extending rotor blades,
wherein the guide device has a contiguous circular arc shaped housing segment enclosing no more than one quarter of the cross-flow rotor in a circumferential direction in such a manner that the cross-flow rotor is driveable by inflowing wind,
wherein the Magnus rotor is configured within the cross-flow rotor so that a Magnus rotor axis extends in a direction of the rotational axis, and
wherein the Magnus rotor has a closed lateral surface and is rotatably drivable by a drive device about the Magnus rotor axis.

2. The wind power hybrid rotor according to claim 1, wherein when rotating, the Magnus rotor is configured to cause, on its lee side, a deflection of air flow with respect to an inflow direction.

3. The wind power hybrid rotor according to claim 2, wherein the deflection occurs in such a manner that air flow flowing through the cross-flow rotor acts in an expanded circular arc on the rotor blades and drives the rotor blades.

4. The wind power hybrid rotor according to claim 3, wherein the rotor blades each have a cross-section with a curved shape comprising a concave and a convex side, and wherein the concave side faces toward the Magnus rotor.

5. The wind power hybrid rotor according to claim 1, wherein the Magnus rotor is driven with a circumferential speed that is approximately one to four times an inflow speed of the wind power hybrid rotor.

6. The wind power hybrid rotor according to claim 1, wherein the cross-flow rotor drives the Magnus rotor.

7. The wind power hybrid rotor according to claim 1, wherein the housing segment has a displacement mechanism and is configured in a pivotable manner, at least with respect to the rotational axis of the cross-flow rotor, and wherein the displacement mechanism is settable depending on an inflow direction in such a manner that the housing segment shields the cross-flow rotor with respect to the rotational axis of the cross-flow rotor on a windward side on one side of the rotational axis.

8. A wind power plant, comprising:
a rotor unit configured to convert wind movements into a rotational movement;
a work device configured to convert kinetic energy of the rotational movement into work to be performed; and a gear device configured to couple the rotor unit to the work device to transmitting the rotational movement to the work device;

wherein the rotor unit has at least one wind power hybrid rotor comprising a cross-flow rotor;

a guide device; and a Magnus rotor;

wherein the cross-flow rotor is configured rotatable about a rotational axis and has a plurality of axially extending rotor blades, wherein the guide device has a contiguous circular arc shaped housing segment enclosing no more than one quarter of the cross-flow rotor in a circumferential direction in such a manner that the cross-flow rotor is driveable by inflowing wind, wherein the Magnus rotor is configured within the cross-flow rotor so that a Magnus rotor axis extends in a direction of the rotational axis, and wherein the Magnus rotor has a closed lateral surface and is rotatably drivable by a drive device about the Magnus rotor axis.

9. The wind power plant according to claim 8, wherein the work device is current generator configured to generate electrical energy.

10. The wind power plant according to claim 8, wherein the work device is a pump unit.

11. A method for converting wind energy into drive energy for performing work, the method comprising the following steps:

rotating a cross-flow rotor that is supported so as to be rotatable about a rotational axis and which has a plurality of axially extending rotor blades;

moving a guide device having a contiguous circular arc shaped housing segment enclosing no more than one quarter of the cross-flow rotor in the circumferential direction to a position with respect to inflowing wind and the cross-flow rotor such that the cross-flow rotor is driven by the inflowing wind;

rotating a Magnus rotor that is arranged within the cross-flow rotor and a Magnus rotor axis of which extends in a direction of the rotational axis, wherein the Magnus rotor has a closed lateral surface and is driven by a drive device about the Magnus rotor axis; and driving a work device by the cross-flow rotor, wherein the Magnus rotor deflects, on its lee side, air flow with respect to an inflow direction in such a manner that the air flow flowing through the cross-flow rotor acts on the rotor blades in an expanded circular arc.

\* \* \* \* \*